(12) United States Patent
Lee

(10) Patent No.: US 9,569,080 B2
(45) Date of Patent: Feb. 14, 2017

(54) MAP LANGUAGE SWITCHING

(71) Applicant: Apple Inc., Cupertino, CA (US)

(72) Inventor: SungChang Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 13/752,734

(22) Filed: Jan. 29, 2013

(65) Prior Publication Data

US 2014/0215330 A1    Jul. 31, 2014

(51) Int. Cl.
| | |
|---|---|
| G09B 29/00 | (2006.01) |
| G06F 3/0484 | (2013.01) |
| G06F 9/44 | (2006.01) |
| G06F 17/30 | (2006.01) |

(52) U.S. Cl.
CPC ......... *G06F 3/04847* (2013.01); *G06F 9/4448* (2013.01); *G06F 17/3087* (2013.01); *G09B 29/007* (2013.01)

(58) Field of Classification Search
CPC  G06F 9/4448; G06F 3/04847; G06F 17/3087; G09B 29/007
See application file for complete search history.

(56) References Cited

U.S. PATENT DOCUMENTS

| | | | |
|---|---|---|---|
| 6,473,728 B1 * | 10/2002 | Tognazzini | 704/3 |
| 7,272,377 B2 | 9/2007 | Cox et al. | |
| 8,255,217 B2 | 8/2012 | Stent et al. | |
| 2005/0246647 A1 * | 11/2005 | Beam et al. | 715/747 |
| 2008/0221862 A1 * | 9/2008 | Guo et al. | 704/2 |
| 2008/0288474 A1 * | 11/2008 | Chin et al. | 707/4 |
| 2009/0005981 A1 * | 1/2009 | Forstall et al. | 701/211 |
| 2009/0178007 A1 * | 7/2009 | Matas et al. | 715/835 |
| 2009/0287471 A1 | 11/2009 | Bennett | |

(Continued)

FOREIGN PATENT DOCUMENTS

| | | |
|---|---|---|
| TW | 200720959 | 6/2007 |
| TW | 201011567 | 3/2010 |
| WO | WO 2010/150764 | 12/2010 |

OTHER PUBLICATIONS

International Search Report and Written Opinion in International Application No. PCT/US2014/013658, mailed Jun. 5, 2014, 11 pages.

(Continued)

*Primary Examiner* — Aaron Lowenberger
(74) *Attorney, Agent, or Firm* — Fish & Richardson P.C.

(57) ABSTRACT

In some implementations, a mobile device can display map user interface that includes a language control that a user can select to switch between a default language and a local language. Map information presented on the map user interface can be initially displayed in the default language. The user can select or manipulate the language control to cause the map information to be presented on the local language. The local language can be determined based on the current location of the mobile device. The language control can be displayed when it has been determined that the local language is not the default language. In some implementations, when a map search has been performed using the default language, the search can be automatically performed again in the local language in response to the user switching the map information displayed on the map user interface to the local language.

27 Claims, 9 Drawing Sheets

(56) References Cited

U.S. PATENT DOCUMENTS

2010/0169074 A1    7/2010   Hung et al.
2010/0286977 A1*   11/2010   Chin et al. .................. 704/4
2011/0130956 A1*    6/2011   Tracton .............. G01C 21/3644
                                                                             701/533
2011/0161829 A1    6/2011   Kristensen
2013/0238332 A1    9/2013   Chen

OTHER PUBLICATIONS

'Google' [online] "Transliteration Layer Google Maps," Oct. 7, 2011 [retrieved on May 21, 2014]. Retrieved from the Internet: http://googlesystem.blogspot.de/2011/10/transliteration-layer-in-google-maps.html, 3 pages.

Anonymous, "Concepts—Google Maps JavaScript API v3—Google Developers," Jan. 16, 2013 [retrieved on May 27, 2014]. Retrieved from the Internet: https://web.archive.org/web/20130116112159/https://developers.google.com/maps/documentation/javascript/basics, 17 pages.

'Google' [online] "Single-language labels in Google Maps," Oct. 7, 2011 [retrieved on May 21, 2014]. Retrieved from the Internet: http://google-latlong.blogspot.de/2011/10/single-language-labels-in-google-maps.html, 2 pages.

Taiwan Office Action in Application No. 103103002, dated Aug. 2, 2016, 18 pages (With English translation).

* cited by examiner

MAP LANGUAGE SWITCHING

TECHNICAL FIELD

The disclosure generally relates to displaying information on maps.

BACKGROUND

Modern mobile devices often include a map application or function. A user can invoke the map application, specify a location and the map application will display a map of the area surrounding the specified location on a user interface of the mobile device. Generally, the map information displayed on the user interface will present information in a default language that the user understands. However, sometimes the map application will be used in a location (e.g., country) where the language used by people at the location is different than that of the user. If the user needs to share the map information (e.g., an address, location name, etc.) with a person who speaks and reads a different language than the user (e.g., a taxi driver in a foreign country), then the user may be required to navigate through various system settings to change the language presented on the map. Often the steps needed to change the language presented on the map can be confusing and time consuming.

SUMMARY

In some implementations, a mobile device can display map user interface that includes a language control that a user can select to switch between a default language and a local language. Map information presented on the map interface can be initially displayed in the default language. The user can select or manipulate the language control to cause the map information to be presented in the local language. The local language can be determined based on the current location of the mobile device. The language control can be displayed when the mobile device has determined that the local language is not the default language. In some implementations, when a map search has been performed using the default language, the search can be automatically performed again in the local language in response to the user switching the map information displayed on the map user interface to the local language so that local language search results can be presented on the map interface.

Particular implementations provide at least the following advantages: A user can quickly and easily change the language used to present map information on a map display by selecting a language control presented on the map display. The user does not have to navigate through a long list of languages in order to change the displayed language as the language control is automatically configured with the language or languages associated the current location of the mobile device. Map information can be quickly shared between people who speak different languages by selecting a simple language control.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Figure 1:
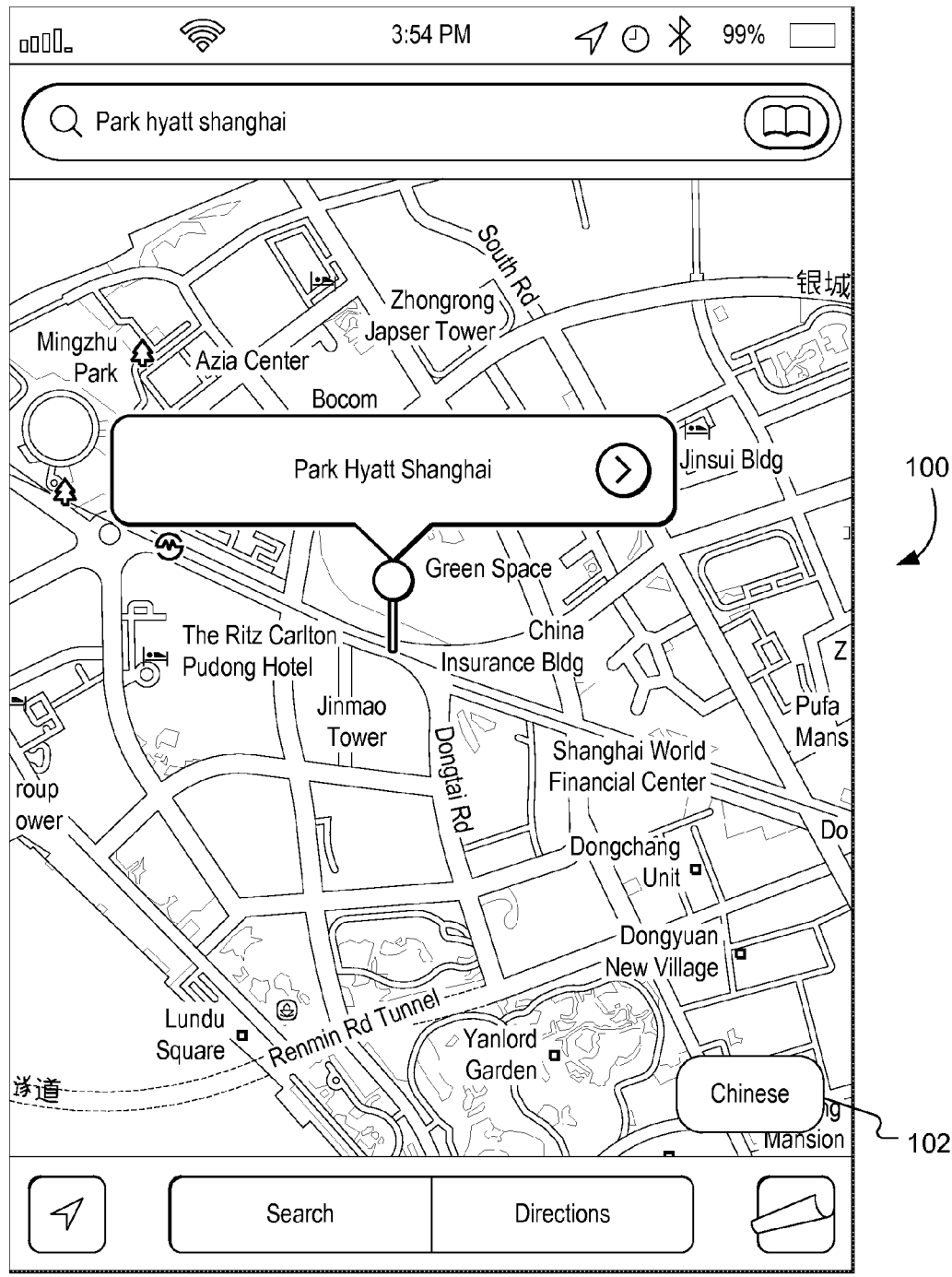
FIG. 1 illustrates an example map graphical user interface for presenting map information in a default language.

FIG. 1 illustrates an example map graphical user interface 100 for presenting map information in a default language. For example, map GUI 100 can be a GUI of a map application on a mobile device configured to display information for a geographic area corresponding to a user specified geographic location or current location of the mobile device. The information displayed on the map interface can include map search terms (e.g., Park hyatt shanghai), map labels (e.g., street names, hotel names, park names, etc.), map control labels and/or any other text that can be displayed on map GUI 100 or another graphical user interface of the map application, for example.

In some implementations, the map application can be configured to display map information in a default language. For example, a user can specify that the default language for the map application is English through a settings interface of the mobile device. When the map application is invoked, information displayed on user interfaces of the map application will be displayed using the default language (e.g., English). Other languages can be specified as the default language. For example, a user who speaks German can specify German as the default language.

In some implementations, map GUI 100 can include graphical object 102 for changing the language used to present information on map GUI 100. For example, graphical object 102 can be a button, switch, toggle or other selectable object that is configured to cause map GUI 100 to present information using a language other than the default language. For example, graphical object 102 can be a semi-transparent control presented on the map display, as illustrated by FIG. 1.

In some implementations, graphical object 102 can be presented, or not presented (e.g., hidden), based on the location of the mobile device. For example, if English is the default language of the map application and the mobile device is currently located in a predominantly English speaking country (e.g., the United States, the United Kingdom, etc.), then graphical object 102 can be hidden as there is not likely to be a need to display map information in a language other than the default language. However, if English is the default map language and the mobile device is in a country where the primary language is not English or if the country has official languages in addition to English, then the mobile device (or map application), can display graphical object 102.

In some implementations, the mobile device (or map application) can use the current location of the mobile device to determine the primary language for the mobile device's current location. For example, the mobile device or map application can retrieve language information for a locale (e.g., current location) from online resources. The mobile device can query the online resources using the current location of the mobile device as the query parameter. Alternatively, the mobile device can store a database that associates languages to locations around the world. The mobile device can search the database using the current location of the mobile device as the search parameter.

In some implementations, the mobile device can retrieve multiple languages associated with the current location of the mobile device. For example, some locations (e.g., countries) may have more than one dominant or commonly used language. Thus, when the mobile device queries online resources or its local database, the mobile device can receive language information identifying more than one language associated with the current location of the mobile device. For example, if the mobile device is located in Belgium, a language query for Belgium can return three official languages: Dutch, French and German.

In some implementations, a user can select graphical object 102 to change the map GUI from the default language to a local language. For example, if the default map language is English and the mobile device is in China, the mobile device can display graphical object 102 and can indicate on (e.g., label) graphical object 102 that Chinese is the local language. When a user selects graphical object 102, the language displayed on the map GUI can be changed from English to Chinese.

In some implementations, if there is more than one common language associated with the current location of the mobile device, graphical object 102 can be configured to present the local languages according to popularity. For example, if the mobile device is in Belgium, graphical object 102 can be configured to present the Dutch language first (e.g., graphical object 102 will be labeled "Dutch"). When the user selects graphical object 102, the map GUI 100 will display map information in Dutch and configure graphical object 102 to present French next (e.g., graphical object 102 will be labeled "French"). When the use selects graphical object 102 again, the map GUI 100 will display map information in French and configure graphical object 102 to present German when next selected. Once the user cycles through the primary languages for a location in this manner, graphical object 102 will be configured to present the default language when selected thereby allowing the user to view the default language once again.

In some implementations, the presentation order of the languages when graphical object 102 is selected can be based on the popularity or usage statistics of the language. For example, in Belgium 59% of people speak Dutch, 31% speak French and a small amount of people speak German. Thus, graphical object 102 can be configured to present Dutch first, French second and German third before allowing the user to select the default (e.g., English) language.

Figure 2:
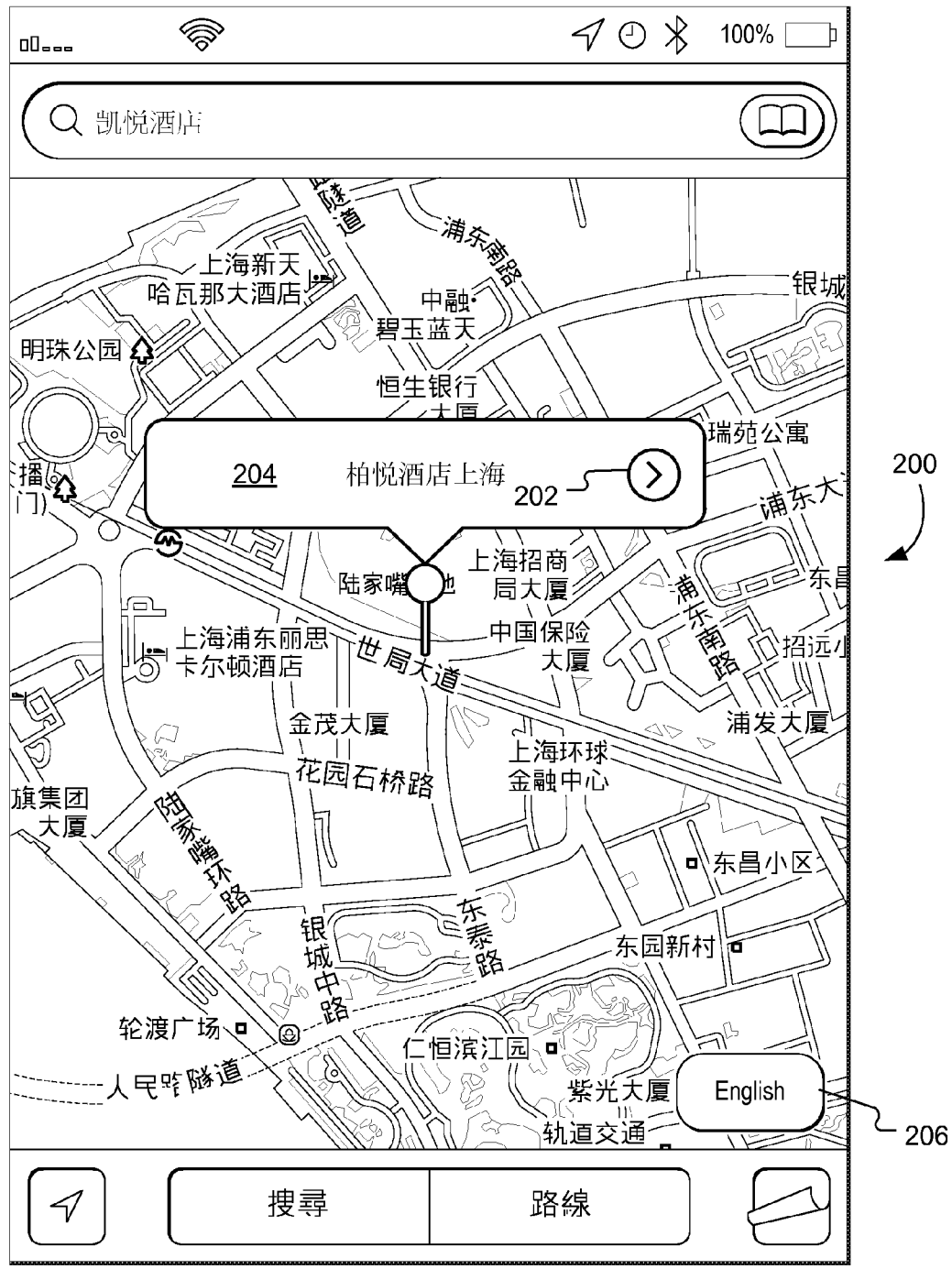
FIG. 2 illustrates an example map graphical user interface for presenting map information in a local language.

FIG. 2 illustrates an example map graphical user interface 200 for presenting map information in a local language. For example, if the mobile device is currently in China, graphical object 102 can be configured to present map information in Chinese upon selection of graphical object 102. Thus, map GUI 200 can be presented in response to a user selecting graphical object 102 of FIG. 1. For example, map GUI 200 presents map information using Chinese symbols. For example, upon selection of graphical object 102, street names, object names, map search terms, user interface controls and other data (e.g., text) presented on map GUI 200 can be converted from the default language (e.g., English) to the local language (e.g., Chinese).

In some implementations, when the map display language is changed to a new language, a previously performed map search can be redone in the new language. For example, in response to a user selecting graphical object 102, the mobile device can translate the map search parameter (e.g., "Park hyatt shanghai") into the local language (e.g., Chinese). Once the map search parameter is translated, the mobile device can perform the map search using the translated map search parameter to find search results in the local language. The local language search results can then be presented on map GUI 200.

In some implementations, when the map display language is changed, the language of input devices can be changed. For example, if the display language is changed to a local language (e.g., Chinese) in response to a user selecting graphical object 102 of FIG. 1, then virtual keyboards, buttons and other input mechanisms can be configured for Chinese input. Thus, if the user or local person who understands the local language wishes to change or input map search parameters in the local language, the virtual keyboard used to input the new search parameters will be automatically configured for the local language.

In some implementations, information displayed on sub-screens (e.g., graphical user interfaces) of the map application can be displayed in the local language. For example, the user can select graphical object 202 to display additional information about a selected location, business, attraction, etc. displayed on map GUI 202. For example, the user can perform a map search by providing the name of a business. The location of the business can be marked by a pin or other graphical object. The user can select the pin to display an overlay 204 identifying the location. The user can select graphical object 202 of the overlay 204 to display a sub-screen that presents additional information about the location marked by the pin. The information presented on the sub-screen can be displayed using the currently selected and/or displayed language (e.g., local language), as illustrated by FIG. 3.

In some implementations, the user can select graphical object 206 to display map information in the default language. For example, selection of graphical object 206 can cause the map application to present map information in the default language (e.g., English) as illustrated by FIG. 1.

Figure 3:
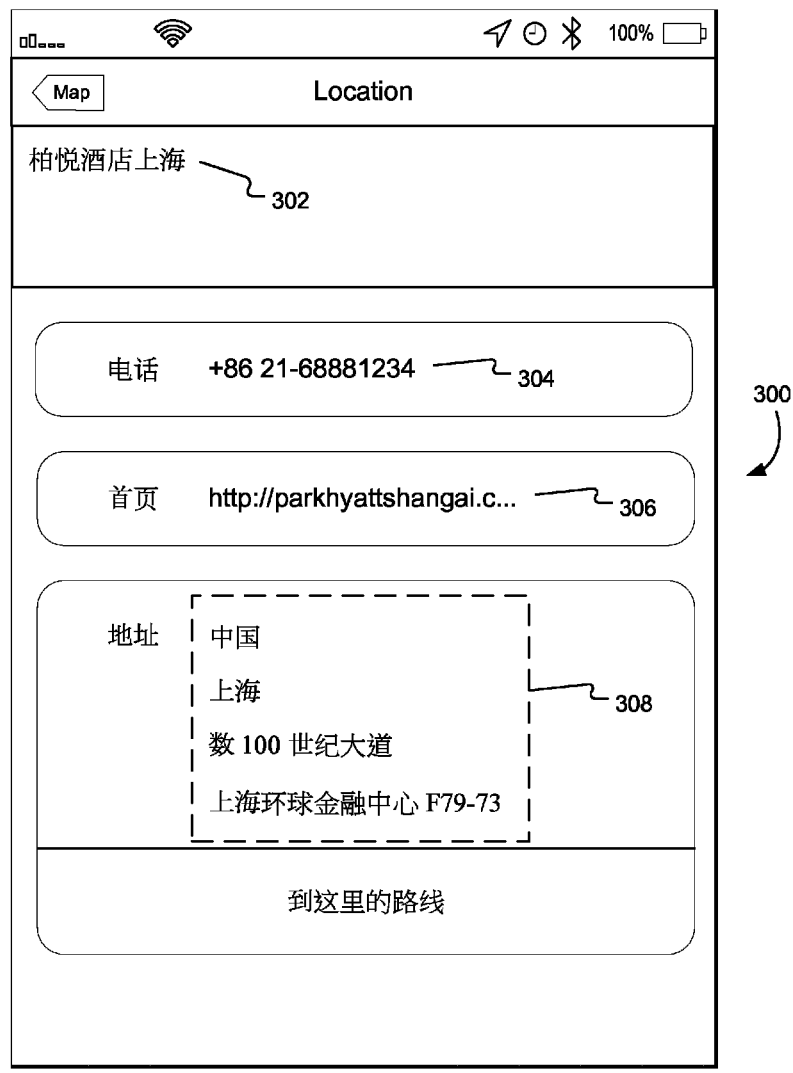
FIG. 3 illustrates an example map graphical user interface for presenting information about a selected location in a local language.

FIG. 3 illustrates an example map graphical user interface 300 for presenting information about a selected location in a local language. In some implementations, instead of displaying location information on map GUI 300 in the default language for the map application, GUI 300 can present the location information in the local language if the user has selected to display map information in the local language by selecting graphical object 102. Map GUI 300 can be a sub-screen of the map application that presents additional information about a location. For example, map GUI 300 can present, in the local language, a name 302 associated with the selected location (e.g., "Park Hyatt Shanghai"), a telephone number 304 associated with the location, a web address 306 associated with the location and/or an address 308 associated with the location.

Figure 4:
FIG. 4 illustrates an example map graphical user interface having a language slider control.

FIG. 4 illustrates an example map graphical user interface 400 having a language slider control. In some implementations, map GUI 400 can include language slider control 402. For example, a user can select and drag slider handle 404 to different positions along slider control 402 to cause different languages to be displayed on map GUI 400. If the user slides slider handle 404 to the far left, English will be displayed on map GUI 400. If the user slides slider handle 404 to the far right Chinese will be displayed on map GUI 400. If the user slides slider handle 404 to the middle, a dual language display including both Chinese and English languages will be presented on map GUI 400. For example, the dual language display can present two lines for each text item on map GUI 400, where the first line is a first language (e.g., English) and the second line is a second language (e.g., Chinese), as illustrated by overlay 406 and search field 408.

In some implementations, slider control 402 can be dynamically configured based on the local languages. For example, if there is only one local language (e.g., Chinese), then the slider control can be configured to display the default language (e.g., English) and the local language (e.g., Chinese). The user can slide slider handle 404 along slider control 402 to select the local language, default language or dual language display. If there is more than one local language (e.g., like in the Belgium example above), then the slider control 402 can be configured to display each local language. For example, the slider control 402 can be configured with a position along the slider control for each local language and the user can move slider handle 404 along slider control 402 to select which language to display.

In some implementations, a user can select graphical object 410 to configure the slider control 402. For example, slider control 402 can be configured to allow the user to change map languages. Slider control 402 can be configured to allow the user to change map type. A user can select graphical object 410 to display a configuration panel that allows the user to change the function of slider control 402.

Figure 5:
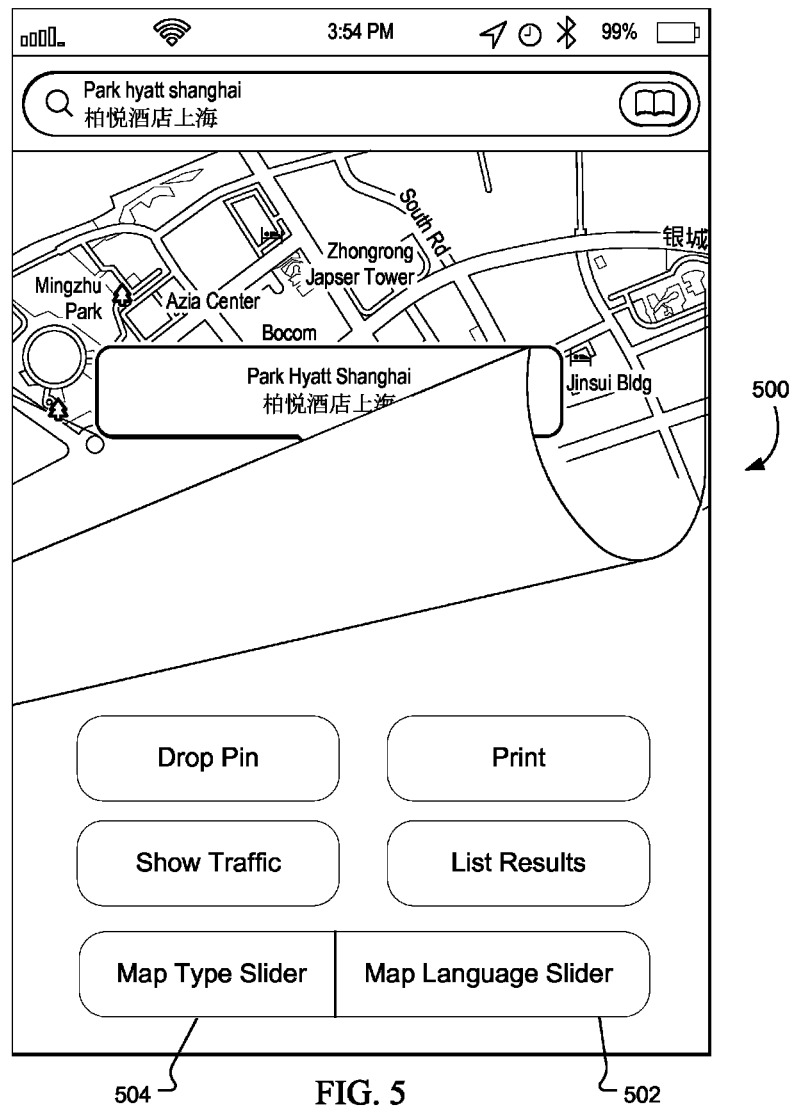
FIG. 5 illustrates an example map graphical user interface for changing the function of the slider control.

FIG. 5 illustrates an example map graphical user interface 500 for changing the function of the slider control. For example, map GUI 500 can be invoked by selecting graphical object 410 of FIG. 4. Map GUI 500 can include graphical objects 502 and 504 for changing the functionality of slider control 402. For example, if slider control 402 is configured to present different languages, a user can select graphical object 504 (e.g., button) to reconfigure slider control 402 to display map types. If slider control 402 is configured to present map types, then selection of graphical object 502 (e.g., button) will cause slider control to be configured to display languages.

Figure 6:
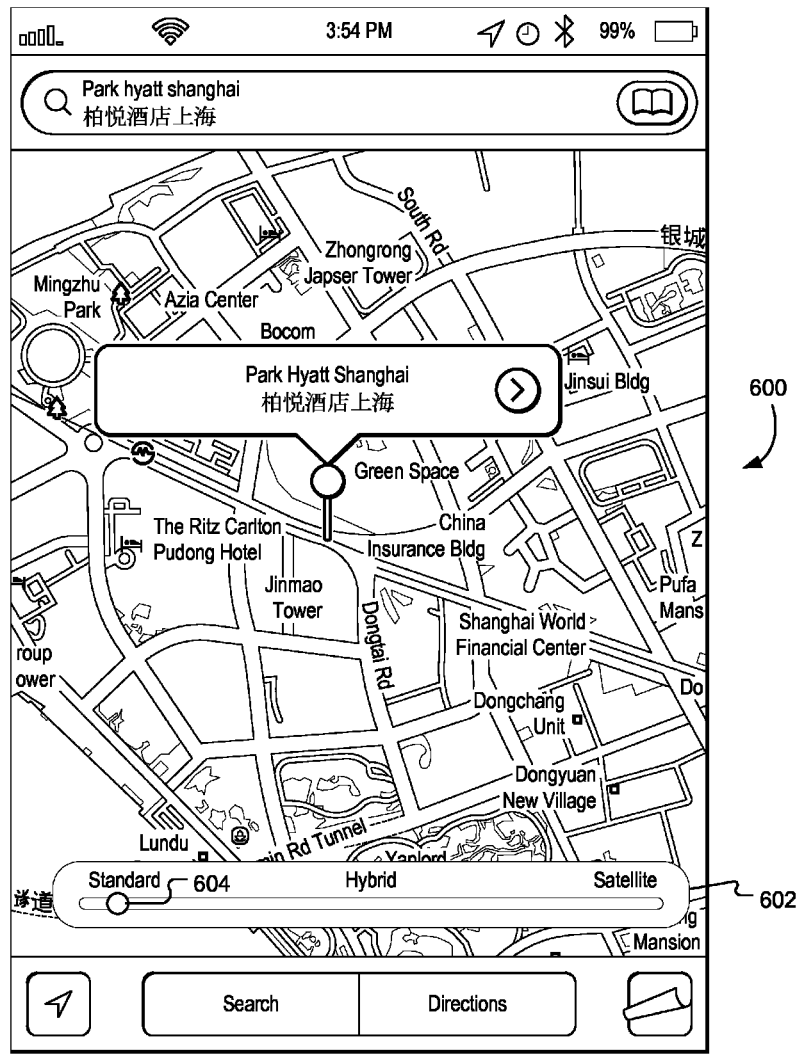
FIG. 6 illustrates an example map graphical user interface having a map type slider control.

FIG. 6 illustrates an example map graphical user interface 600 having a map type slider control. For example, slider control 602 can be configured to display different map types in response to a user selecting graphical object 504 of FIG. 5. For example, the different map types can be standard (e.g., line map), satellite (e.g., satellite image map) and/or hybrid (e.g., line and satellite image map). A user can move slider handle 604 to different positions on slider control 602 to cause different types of maps to be displayed by map GUI 600.

Example Process

Figure 7:
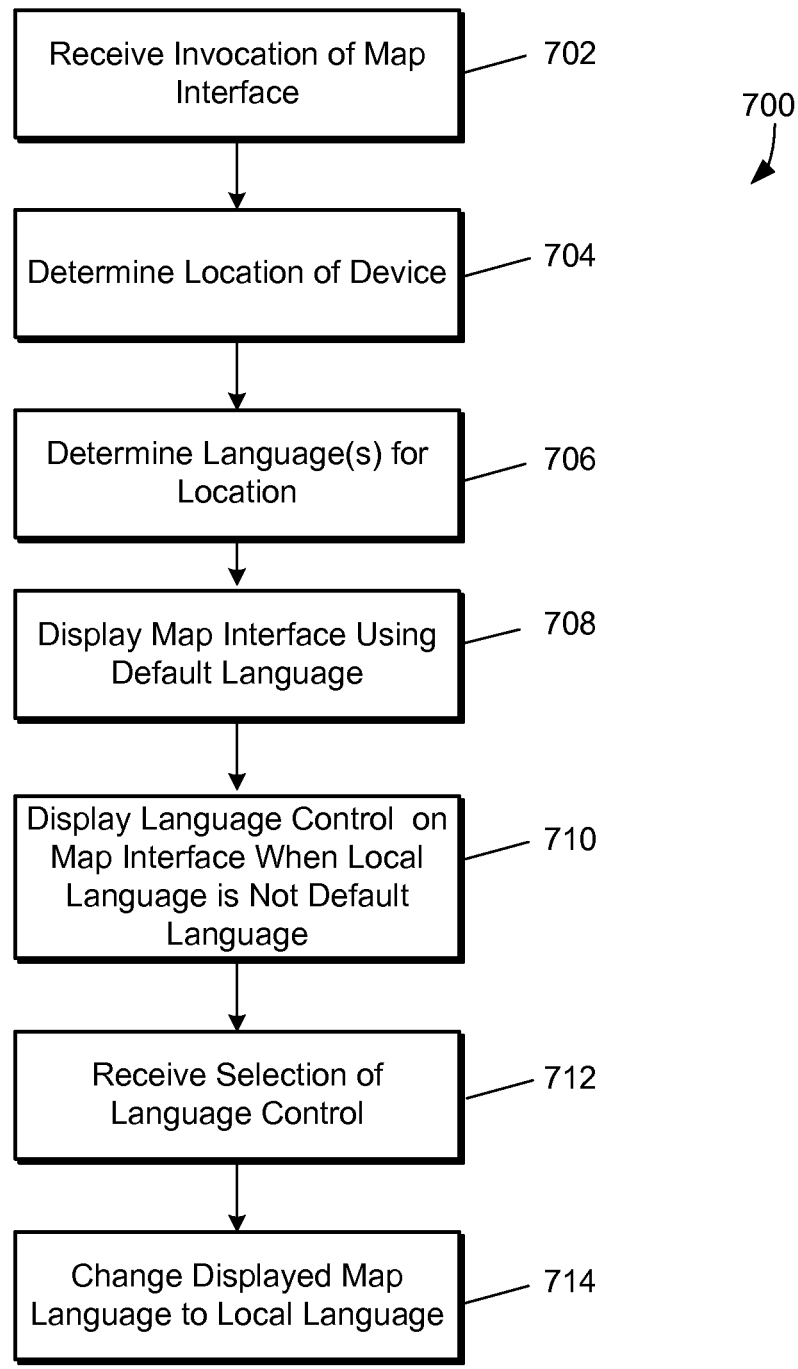
FIG. 7 is a flow diagram of an example process for map language switching.

FIG. 7 is a flow diagram of an example process 700 for map language switching. At step 702, an invocation of a map graphical user interface is received. For example, a user can invoke the map interface by selecting a map application or map function of a mobile device.

At step 704, the location of the mobile device can be determined. For example, the mobile device can have a global navigation satellite system receiver that can receive signals from one or more navigation satellites. The mobile device can then use the received signals to determine the geographic location of the mobile device. Alternatively, the mobile device can use wireless access point and/or cellular transmitter signals to determine the location of the mobile device, according to known techniques.

At step 706, the mobile device can determine one or more local languages for the current location of the mobile device. For example, the mobile device can send the current location of the mobile device to a network (e.g., internet) language service and receive from the language service one or more languages for the current location of the mobile device. Alternatively, the mobile device can store a database containing language information for locations around the world. For example, the mobile device can store a database identifying the primary, most popular, or official languages for each country around the world. If the current location of the mobile device corresponds to a particular country, the languages for the particular country can be retrieved from the database.

At step 708, the mobile device can display the map interface using a default language. For example, the mobile device can be configured to display information on the map interface using a default language. The user of the mobile device can configure the default language of the map interface, for example. When the map interface is displayed, information, controls, buttons, text, etc. displayed on the map interface will initially be displayed using the default language.

At step 710, a language control can be displayed on the map interface when the local language is not the default language. For example, if the default language for the map interface is English but the local languages include a language other than English, then a language control (e.g., toggle, button, slider, etc.) can be displayed on the map interface. In some implementations, the language control can be a semi-transparent control overlaid upon the map information displayed on the map interface. The language control can be configured to allow the user to select and display the default language and/or the local languages for the current location of the mobile device.

At step 712, the user can select or manipulate the language control. For example, if the language control is a button, the user can select the button the change the language of the map interface to one or more of the local languages. Each selection of the language control can cause the map interface to display a different local language or the default language. For example, if there are two local languages, the first selection of the language control can cause the first local language to be presented, the second selection of the language control can cause the second local language to be presented, and the third selection of the language control can cause the default language to be presented. If the language control is a slider control, then manipulation of the slider control can cause different languages to be displayed on the map interface, as described above.

At step 714, the language used to display information on the map interface can be changed to a local language. For example, in response to the selection or manipulation of the language control at step 712, the map interface can display map information in a local language. For example, map interface controls, input devices (e.g., virtual keyboards), map labels, street names, etc. can be changed from the default language to a local language corresponding to the current location of the mobile device.

Figure 8:
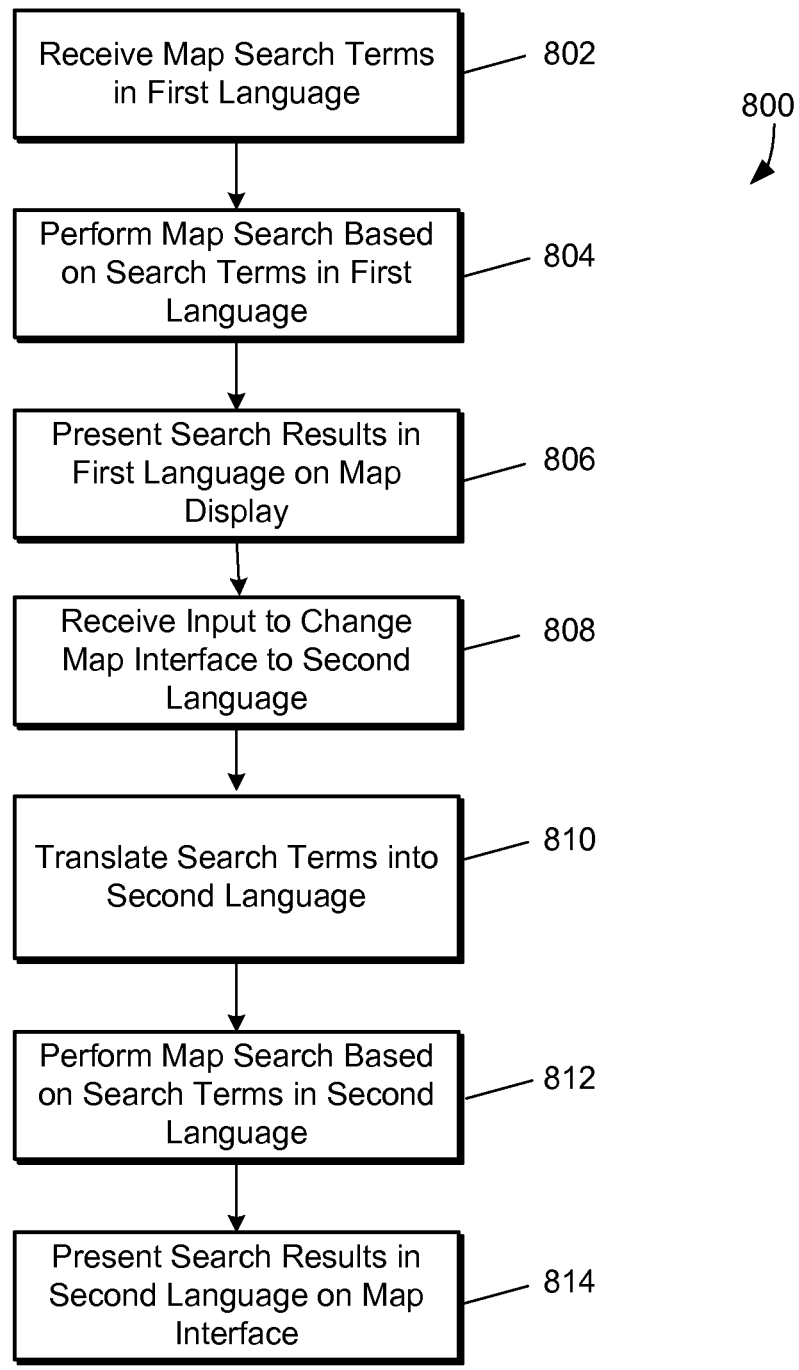
FIG. 8 is a flow diagram of an example process for generating map search results in a local language.

FIG. 8 is a flow diagram of an example process 800 for generating map search results in a local language. At step 802, map search terms can be received in a first language. For example, the map interface can include a search input object that allows the user to input textual search terms. The user can interact with a virtual keyboard to input search terms, for example. The map interface can be presented using a default language and the search terms and virtual keyboard can be input and/or presented using the default language.

At step 804, a map search can be performed based on the search terms in the first language. For example, map information can be searched using the user provided search terms in the first (e.g., default) language. For example, the search terms can be sent to a network (e.g., internet) map service. The map service can return search results to the mobile device for display on the map interface.

At step 806, the search results can be presented on the map display in the first language. For example, if the search terms identify a location, business, attraction, etc. that is found during the map search, then the search results can be presented on the map interface using the first language. For example, the labels, addresses, descriptions or other information displayed on the map that identify the search results can be displayed in the first (e.g., default) language.

At step 808, input can be received from the user to change the map interface to a second language. For example, the map interface can include a language control that allows a user to change the map interface from the default language to a local language, as described above. In response to the user selecting to change the map interface to the second language, the information displayed on the map interface can be displayed in the second language.

At step 810, the search terms in the first language can be translated into a second language. For example, in response to the user selecting to change the language displayed on the map interface to a local language, the mobile device can automatically translate the user provided search terms in the first language to a second (e.g., local) language. For example, the mobile device can use a network service to translate the search terms in the first language to a second language.

At step 812, a map search can be performed based on the search terms in the second language. For example, a map search can be automatically performed based on the translated search terms in the local language. For example, the mobile device can send the translated search terms in the local language to a network (e.g., internet) map service. The map service can return search results to the mobile device for display on the map interface in the local language.

At step 814, the search results in the second language can be presented on the map interface. For example, the results of the map search performed at step 812 can be automatically presented on the map interface in the selected local language. For example, if the search terms identify a location, business, attraction, etc. that is found during the map search, then the search results can be presented on the map interface using the second (e.g., local) language. For example, the labels, addresses, descriptions or other information displayed on the map that identify the search results can be displayed in the second (e.g., local) language.

Example System Architecture

Figure 9:
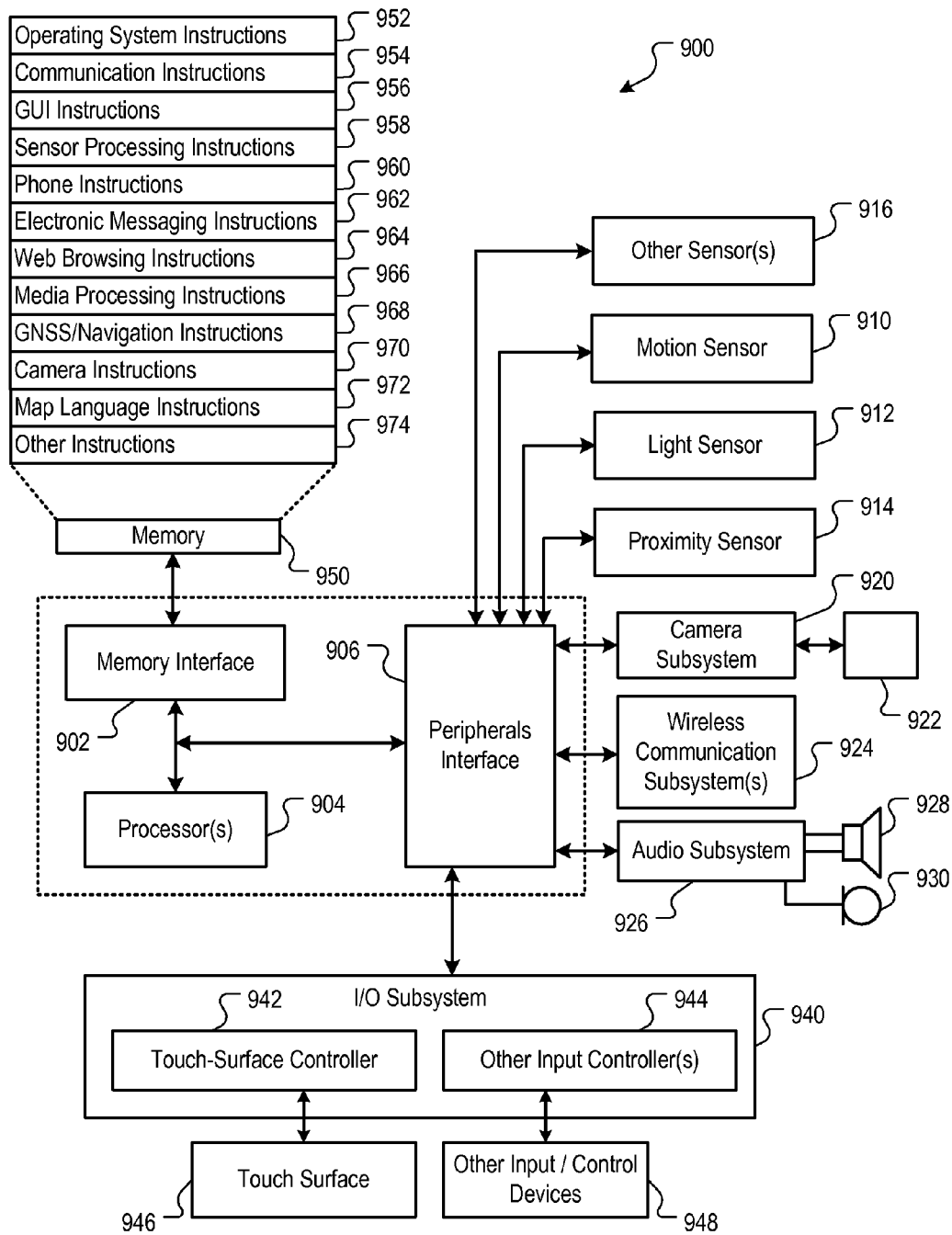
FIG. 9 is a block diagram of an example computing device that can implement the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the map language switching features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the map language switching processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

What is claimed is:

1. A method comprising:
receiving an invocation of a map interface on a mobile device, the map interface having a default language;
obtaining a current location of the mobile device;
obtaining one or more local languages associated with the current location;
determining if the one or more local languages associated with the current location correspond to the default language; and
based on determining that at least one of the local languages does not correspond to the default language, displaying the map interface including a language control that indicates two or more languages for presenting information on the map interface and that can be manipulated to present information on the map interface concurrently in the two or more languages, wherein an amount of information presented in each of the two or more languages is adjusted based on the manipulation of the language control.

2. The method of claim 1, wherein the language control is a graphical object, the method further comprising:
receiving a user input selecting the language control; and
based on receiving the user input, updating the map interface to present information in one of the local languages.

3. The method of claim 1, where the language control is a slider control indicating the two or more languages for presenting information on the map interface, and wherein a user can manipulate the slider control to select from the two or more languages for presenting information on the map interface.

4. The method of claim 3, further comprising:
receiving a user input selecting a position of the slider control that corresponds to two languages; and
based on receiving the user input, updating the map interface to present information in the two languages associated with the selected position of the slider control.

5. The method of claim 1, wherein the language control indicates availability of a first language of the local languages, the method further comprising:
receiving a first selection of the language control;
in response to receiving the first selection, displaying the information on the map interface in the first language; and
updating the language control on the map interface to indicate availability of a second language of the local languages.

6. The method of claim 5, further comprising:
receiving a second selection of the language control; and
in response to receiving the second selection, displaying the information on the map interface in the second language.

7. The method of claim 5, further comprising:
receiving an invocation of a sub-screen of the map interface; and
displaying the sub-screen, where information displayed on the sub-screen is presented in the first language of the local languages.

8. The method of claim 1, further comprising:
receiving search terms in a first language;
performing a first search based on the search terms;
presenting first search results on the map interface in the first language;
receiving a selection of the language control; and
in response to the selection, translating the search terms into a second language, performing a second search based on the translated search terms and presenting second search results on the map interface in the second language.

9. The method of claim 3, wherein the two or more languages includes the default language and at least one local language, and wherein an amount of information that is presented on the map interface in the default language and an amount of information that is presented in the at least one local language are varied based on a selected position of the language control.

10. A non-transitory computer-readable medium including one or more sequences of instructions which, when executed by one or more processors, cause the one or more processors to perform operations comprising:
receiving an invocation of a map interface on a mobile device, the map interface having a default language;
obtaining a current location of the mobile device;
obtaining one or more local languages associated with the current location;
determining if the one or more local languages associated with the current location correspond to the default language; and
based on determining that at least one of the local languages does not correspond to the default language, displaying the map interface including a language control that indicates two or more languages for presenting information on the map interface and that can be manipulated to present information on the map interface concurrently in the two or more languages, wherein an amount of information presented in each of the two or more languages is adjusted based on the manipulation of the language control.

11. The non-transitory computer-readable medium of claim 10, wherein the language control is a graphical object, and wherein the instructions cause the one or more processors to perform operations comprising:
receiving a user input selecting the language control; and
based on receiving the user input, updating the map interface to present information in one of the local languages.

12. The non-transitory computer-readable medium of claim 10, where the language control is a slider control indicating the two or more languages for presenting information on the map interface, and wherein a user can manipulate the slider control to select from the two or more languages for presenting information on the map interface.

13. The non-transitory computer-readable medium of claim 12, wherein the instructions cause the one or more processors to perform operations further comprising:
receiving a user input selecting a position of the slider control that corresponds to two languages; and
based on receiving the user input, updating the map interface to present information in the two languages associated with the selected position of the slider control.

14. The non-transitory computer-readable medium of claim 10, wherein the language control indicates availability of a first language of the local languages, and wherein the instructions cause the one or more processors to perform operations comprising:
receiving a first selection of the language control;
in response to receiving the first selection, displaying the information on the map interface in the first language; and
updating the language control on the map interface to indicate availability of a second language of the local languages.

15. The non-transitory computer-readable medium of claim 14, wherein the instructions cause the one or more processors to perform operations comprising:
receiving a second selection of the language control; and
in response to receiving the second selection, displaying the information on the map interface in the second language.

16. The non-transitory computer-readable medium of claim 14, wherein the instructions cause the one or more processors to perform operations comprising:
receiving an invocation of a sub-screen of the map interface; and
displaying the sub-screen, where information displayed on the sub-screen is presented in the first language of the local languages.

17. The non-transitory computer-readable medium of claim 10, wherein the instructions cause the one or more processors to perform operations comprising:
receiving search terms in a first language;
performing a first search based on the search terms;
presenting first search results on the map interface in the first language;
receiving a selection of the language control; and
in response to the selection, translating the search terms into a second language, performing a second search based on the translated search terms and presenting second search results on the map interface in the second language.

18. The non-transitory computer-readable medium of claim 10, wherein the two or more languages includes the default language and at least one local language, and wherein an amount of information that is presented on the map interface in the default language and an amount of information that is presented in the at least one local language are varied based on a selected position of the language control.

19. A system comprising:
one or more processors; and
a computer-readable medium including one or more sequences of instructions which, when executed by the one or more processors, cause the one or more processors to perform operations comprising:
  receiving an invocation of a map interface on a mobile device, the map interface having a default language;
  obtaining a current location of the mobile device;
  obtaining one or more local languages associated with the current location;
  determining if the one or more local languages associated with the current location correspond to the default language; and
  based on determining that at least one of the local languages does not correspond to the default language, displaying the map interface including a language control that indicates two or more languages for presenting information on the map interface and that can be manipulated to present information on the map interface concurrently in the two or more languages, wherein an amount of information presented in each of the two or more languages is adjusted based on the manipulation of the language control.

20. The system of claim 19, wherein the language control is a graphical object, and wherein the instructions cause the one or more processors to perform operations comprising:
  receiving a user input selecting the language control; and
  based on receiving the user input, updating the map interface to present information in one of the local languages.

21. The system of claim 19, where the language control is a slider control indicating the two or more languages for presenting information on the map interface, and wherein a user can manipulate the slider control to select from the two or more languages for presenting information on the map interface.

22. The system of claim 21, wherein the instructions cause the one or more processors to perform operations further comprising:
  receiving a user input selecting a position of the slider control that corresponds to two languages; and
  based on receiving the user input, updating the map interface to present information in the two languages associated with the selected position of the slider control.

23. The system of claim 19, wherein the instructions cause the one or more processors to perform operations comprising:
  receiving a first selection of the language control; and
  in response to receiving the first selection, displaying the information on the map interface in a first language of the local languages.

24. The system of claim 23, wherein the language control indicates availability of a first language of the local languages, and wherein the instructions cause the one or more processors to perform operations comprising:
  receiving a first selection of the language control;
  in response to receiving the first selection, displaying the information on the map interface in the first language; and
  updating the language control on the map interface to indicate availability of a second language of the local languages.

25. The system of claim 23, wherein the instructions cause the one or more processors to perform operations comprising:
  receiving an invocation of a sub-screen of the map interface; and
  displaying the sub-screen, where information displayed on the sub-screen is presented in the first language of the local languages.

26. The system of claim 19, wherein the instructions cause the one or more processors to perform operations comprising:
  receiving search terms in a first language;
  performing a first search based on the search terms;
  presenting first search results on the map interface in the first language;
  receiving a selection of the language control; and
  in response to the selection, translating the search terms into a second language, performing a second search based on the translated search terms and presenting second search results on the map interface in the second language.

27. The system of claim 19, wherein the two or more languages includes the default language and at least one local language, and wherein an amount of information that is presented on the map interface in the default language and an amount of information that is presented in the at least one local language are varied based on a selected position of the language control.

* * * * *

UNITED STATES PATENT AND TRADEMARK OFFICE
CERTIFICATE OF CORRECTION

PATENT NO. : 9,569,080 B2
APPLICATION NO. : 13/752734
DATED : February 14, 2017
INVENTOR(S) : SungChang Lee It is certified that error appears in the above-identified patent and that said Letters Patent is hereby corrected as shown below:

In the Claims

In Claim 9, Column 11, Line 34, delete "claim 3," and insert -- claim 1, --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*